(12) United States Patent
Tu et al.

(10) Patent No.: US 9,304,708 B2
(45) Date of Patent: Apr. 5, 2016

(54) DATA ACCESSING METHOD AND ELECTRONIC APPARATUS UTILIZING THE DATA ACCESSING METHOD

(71) Applicant: MStar Semiconductor, Inc., Hsinchu Hsien (TW)

(72) Inventors: Ying-Chieh Tu, Hsinchu Hsien (TW); Wei-Hsiang Hong, Hsinchu Hsien (TW); Yu-Cheng Lin, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 17 days.

(21) Appl. No.: 14/147,767

(22) Filed: Jan. 6, 2014

(65) Prior Publication Data

US 2014/0195736 A1    Jul. 10, 2014

(30) Foreign Application Priority Data

Jan. 7, 2013 (TW) .............................. 102100431 A

(51) Int. Cl.
*G06F 3/06* (2006.01)

(52) U.S. Cl.
CPC ............ *G06F 3/0655* (2013.01); *G06F 3/0622* (2013.01); *G06F 3/0683* (2013.01); *G06F 3/0688* (2013.01); *G06F 2212/7208* (2013.01)

(58) Field of Classification Search
None
See application file for complete search history.

(56) References Cited

U.S. PATENT DOCUMENTS

| | | | |
|---|---|---|---|
| 2005/0036046 A1* | 2/2005 | Atsum | 348/264 |
| 2009/0198873 A1* | 8/2009 | Tzeng | 711/103 |
| 2009/0219779 A1* | 9/2009 | Mao et al. | 365/233.11 |
| 2011/0047330 A1* | 2/2011 | Potapov et al. | 711/114 |
| 2012/0290768 A1* | 11/2012 | Rubowitz | 711/103 |

FOREIGN PATENT DOCUMENTS

TW           201026070 A        7/2010

* cited by examiner

*Primary Examiner* — Kris Rhu
(74) *Attorney, Agent, or Firm* — Edell, Shapiro & Finnan, LLC

(57) ABSTRACT

A data access method applicable on an electronic apparatus is provided. The electronic apparatus comprises a control unit, a first storage apparatus, and a second storage apparatus. The method comprising: storing a first part of data and a second part of data of a data group in the first storage apparatus and the second storage apparatus, respectively; and selectively accessing the first storage apparatus and the second storage apparatus via different data paths for the first part of data and the second part of data, wherein access speed to the first storage apparatus is different from access speed to the second storage apparatus.

8 Claims, 6 Drawing Sheets

(a)

(b)

DATA ACCESSING METHOD AND ELECTRONIC APPARATUS UTILIZING THE DATA ACCESSING METHOD

CROSS REFERENCE TO RELATED APPLICATIONS

This application claims priority under 35 U.S.C 119 to Taiwan patent application, TW102100431, filed on Jan. 7, 2013, the disclosure of which is incorporated herein by reference.

BACKGROUND OF THE INVENTION

1. Field of the Invention

The present invention relates to a data access method and electronics utilizing the data access method, and more particularly, to a data access method for storing data into different devices corresponding to different access paths and electronics utilizing the data access method.

2. Description of the Prior Art

Conventionally, it is used to save one group of data in one single memory as shown in the FIG. 1, for example, saving an image frame Fr in one single memory 100. However, an apparent issue of how to select the single memory to store the group of data exists in this conventional mechanism. Take an example of electronics having both internal and external memories, the internal memory is the memory built in the electronics, which may be integrated in the same chip with other circuits. The external memory such as a memory card can be flexibly inserted in or removed from the electronics by user. Due to cost considerations, only the external memory having limited data bandwidth or low data access rate, such as an external hard drive, can be selected. On the other hand, the capacity of internal memory is also limited. In other words, under the above constraints of internal and external memories, it may be impossible to save a whole data group in the internal memory with limited capacity; otherwise, it may take too much time to access the data group while saving the whole data group in the external memory.

Besides, using a single data path of one memory to access the data group saved in the memory usually occupies exclusively the whole bandwidth; no other data access to the same memory can take place at the same time.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

Hence, one of various objectives of the present invention is to provide a data access method for accessing two or more storage apparatuses with different characteristics via different access paths.

In one embodiment of the present invention, a data access method applicable on an electronic apparatus is provided. The electronic apparatus comprises a first storage apparatus, and a second storage apparatus. The method comprising: storing a first part of data and a second part of data of a data group in the first storage apparatus and the second storage apparatus, respectively; and selectively accessing the first storage apparatus and the second storage apparatus via different data paths for the first part of data and the second part of data, wherein access speed to the first storage apparatus is different from access speed to the second storage apparatus.

In another embodiment of the present invention, an electronic apparatus is disclosed. The electronic apparatus comprises a first storage apparatus; a second storage apparatus, wherein access speed to the first storage apparatus is higher than access speed to the second storage apparatus; and a control unit, configured to access the first storage apparatus and the second storage apparatus via different data paths. The control unit is further configured to store a first part of data and a second part of data of a data group in the first storage apparatus and the second storage apparatus, respectively, and to selectively access the first storage apparatus and the second storage apparatus via different data paths for the first part of data and the second part of data.

Based on the embodiments discussed above, a data group could be saved into two types of storage apparatuses having different characteristics in order to avoid the conventional problems caused by selecting a single type of storage apparatus for storing the whole data group. That is, two data access paths are utilized for accessing two different types of storage apparatuses; it eliminates the conventional problem that the transmission bandwidth to single storage apparatus is occupied exclusively.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
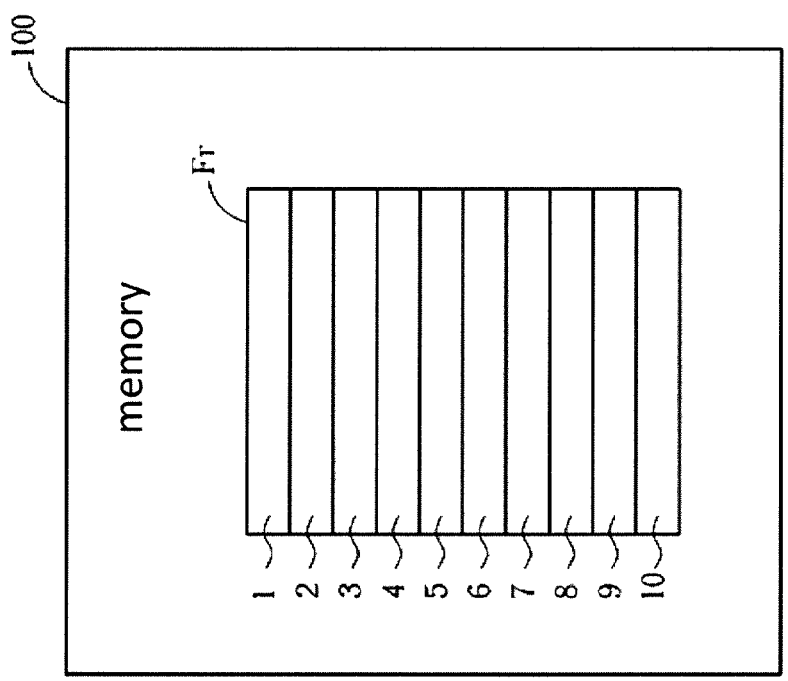
FIG. 1 depicts a block diagram showing a single data group is saved in one memory in the prior art.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Figure 2:
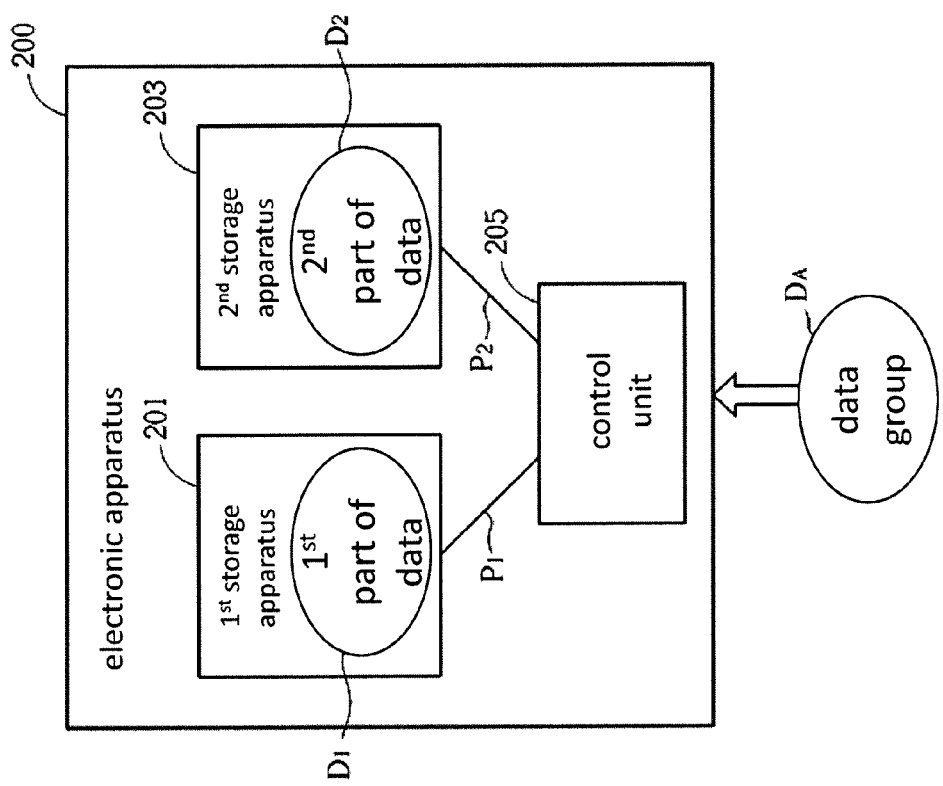
FIG. 2 illustrates a block diagram of an electronic apparatus according to an embodiment of the present invention.

FIG. 2 illustrates a block diagram of an electronic apparatus according to an embodiment of the present invention. As shown in FIG. 2, the electronic apparatus comprises a first storage apparatus 201, a second storage apparatus 203, and a control unit 205. The first storage apparatus 201 and the second storage apparatus 203 may be memories or any other storage devices. Moreover, the data access speed of the first storage apparatus 201 is higher than the data access speed of the second storage apparatus 203. When writing data, the control unit 205 stores a first part of data $D_1$ and a second part of data $D_2$ of a data group $D_A$ to the first storage apparatus 201 and the second storage apparatus 203, respectively. When reading data, the control unit 205 determines whether the data to be read belong to the first part of data $D_1$ or the second part of data $D_2$, and fetches the data to be read from the first storage apparatus 201 or the second storage apparatus 203. In some cases, the data to be read consists of data belonging to the first part of data $D_1$ as well as the second part of data $D_2$, they would be retrieved from the first storage apparatus 201 and the second storage apparatus 203 by the control unit 205, respectively. In other words, the sum of the first part of data $D_1$ and the second part of data $D_2$ may be a part or the whole of the data group $D_A$. In one embodiment, the data of the data group $D_A$ is classified to the first part of data $D_1$ and the second part of data $D_2$ in an alternative fashion. Therefore the electronic apparatus accesses the first storage apparatus 201 and the second storage apparatus 203 in the alternative fashion.

Figure 3:
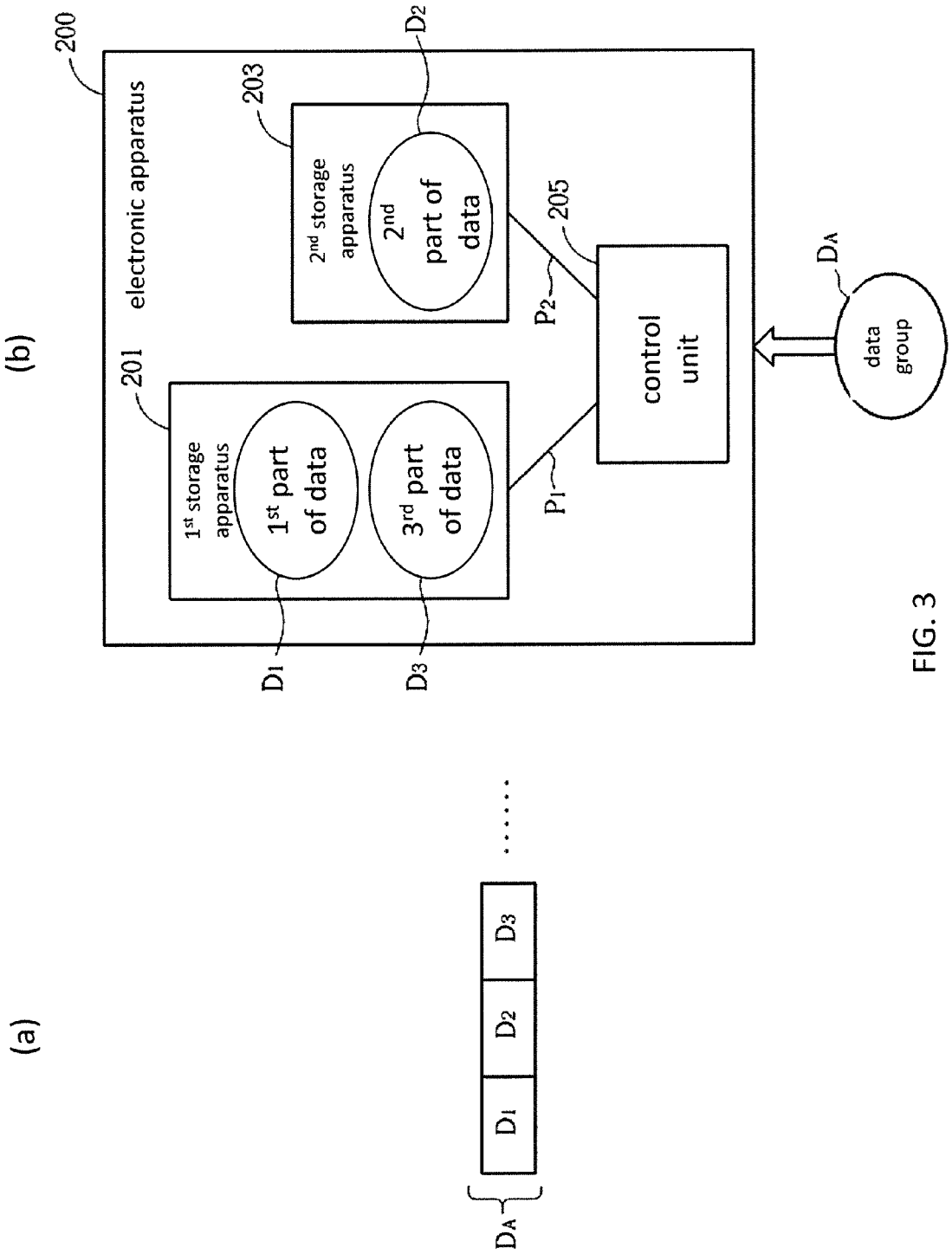
FIGS. 3(a) and 3(b) show block diagrams of electronic apparatuses in accordance with an embodiment of the present invention, respectively.

FIG. 3(a) and FIG. 3(b) shows block diagrams of electronic apparatuses in accordance with an embodiment of the present invention. In this embodiment, in additional to the first part of data $D_1$ and the second part of data $D_2$, the data group $D_A$ also includes a third part of data $D_3$. The second part of data $D_2$ is concatenated to the first part of data $D_1$ and the third part of data $D_3$ is concatenated to the second part of data $D_2$. The control unit 205 stores the first part of data $D_1$ and the third part of data D3 in the first storage apparatus 201 and stores the second part of data $D_2$ in the second storage apparatus 203 as shown in the FIG. 3(b). When reading data, the control unit 205 follows the sequence, the first part of data $D_1$, the second part of data $D_2$, and the third part of data $D_3$ in order to reconstruct the original data group $D_A$. Please be aware that the storage arrangement of the first part of data $D_1$, the second part of data $D_2$, and the third part of data $D_3$ is not limited to the embodiment shown in the FIG. 3(b). For example, the control unit 205 may store the first part of data $D_1$ and the third part of data $D_3$ in the second storage apparatus 203 and stores the second part of data $D_2$ in the first storage apparatus 201.

Figure 4:
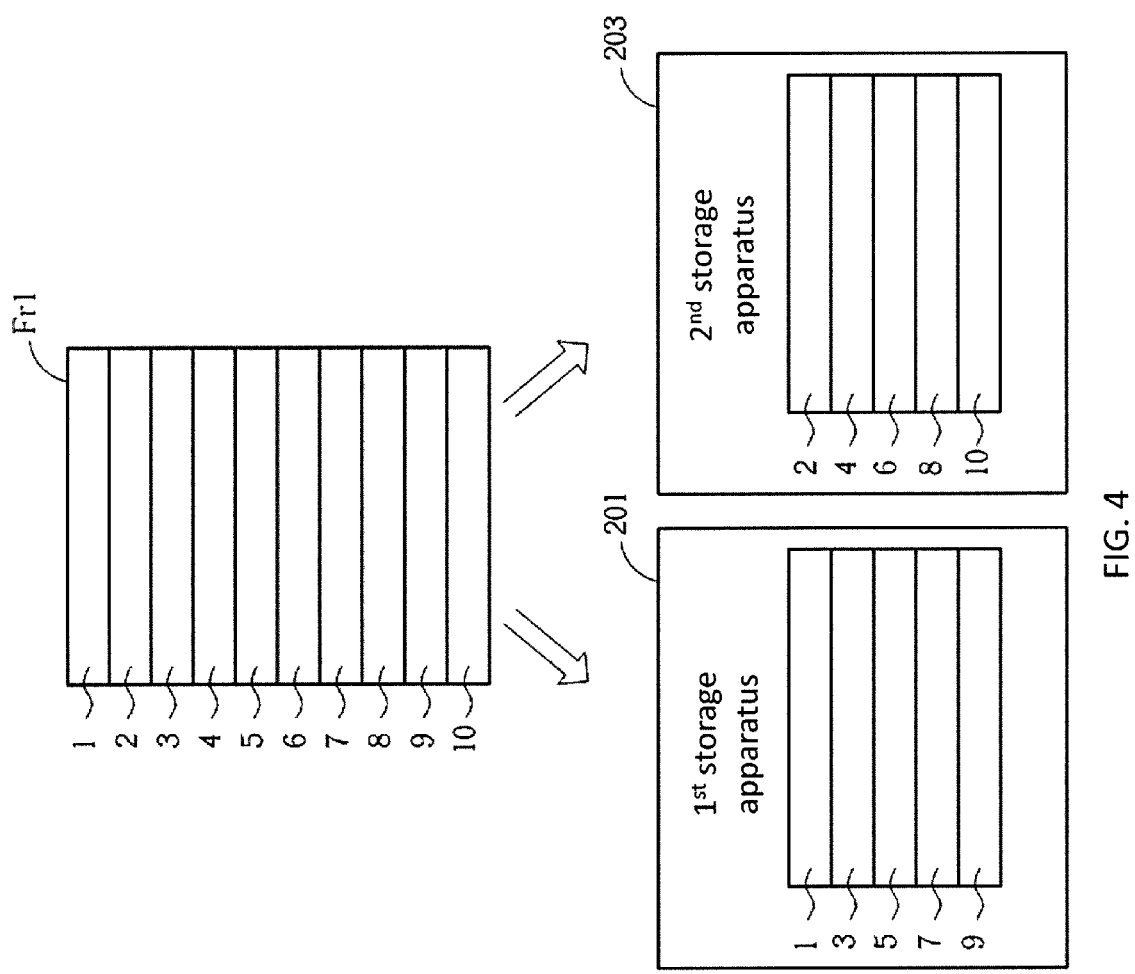
FIG. 4 depicts a diagram showing the electronic apparatus according to the present invention accessing an image frame.

The data group $D_A$ may be an image frame. FIG. 4 depicts a diagram showing the electronic apparatus accessing an image frame according to the present invention. As shown in FIG. 4, an image frame Fr (i.e., the data group $D_A$) comprises pixel rows 1-10. In one embodiment, the control unit (not shown in FIG. 4) stores the odd pixel rows 1, 3, 5, 7, and 9 to the first storage apparatus 201, and stores the even pixel rows 2, 4, 6, 8, and 10 to the second storage apparatus 203. When reading data, the control unit alternatively reads the pixel row 1 in the first storage apparatus 201, the pixel row 2 in the second storage apparatus 203, the pixel row 3 in the first storage apparatus 201, and so on to reconstruct the original image frame Fr. In one embodiment, the first storage apparatus 201 and the second storage apparatus 203 are utilized as image buffers. After being read out, the pixel rows stored in the image buffers would further be compressed and saved. Please be aware that the first storage apparatus 201 and the second storage apparatus 203 can be used to store a part or a whole image frame Fr. And the storage arrangement of pixel rows is not limited to the form as shown in FIG. 4. In an alternative embodiment, the even pixel rows are arranged to be saved in the first storage apparatus 201 and the odd pixel rows are arranged to be saved in the second storage apparatus 203. Besides, the unit of storage may not be a row of pixel. In one embodiment, one half of each pixel row is stored in the first storage apparatus 201 and the other half of each pixel row is stored in the second storage apparatus 203.

Figure 5:
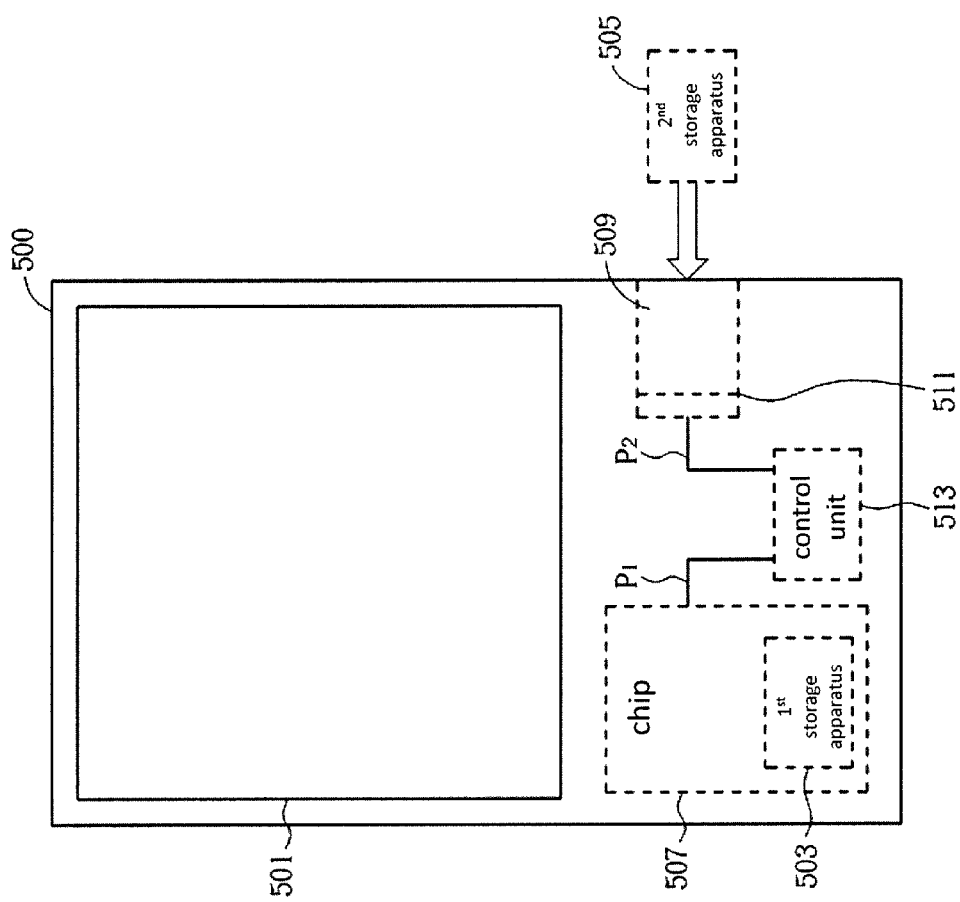
FIG. 5 illustrates a block diagram of an electronic apparatus according to another embodiment of the present invention.

In one embodiment, the first storage apparatus is an internal memory of the electronic apparatus and the second storage apparatus is an external memory of the electronic apparatus. FIG. 5 illustrates a block diagram of an electronic apparatus according to another embodiment of the present invention. In this embodiment, the electronic apparatus 500 is a hand-held cellphone. However, the electronic apparatus 500 may be other kinds of electronics such as laptop computer and etc. As shown in FIG. 5, the electronic apparatus 500 includes a display 501 as a user interface. Besides, the electronic apparatus 500 may further includes other user interfaces not shown in FIG. 5. In the embodiment shown in FIG. 5, a first storage apparatus 503 is an internal memory which is integrated with other internal circuits in a chip 507. The first storage apparatus 503 can be a high-access-speed storage device such as static random access memory or flip-flop. The electronic apparatus 500 includes a slot 509 and an interconnection interface 511. In this embodiment, a second storage apparatus 503 is a memory card which could be inserted into the slot 509 and interconnected with the electronic apparatus 500 via the interface 511. And the second storage apparatus 503 is removable from the interface 511. A control unit 513 accesses to the first storage apparatus 503 and the second storage apparatus 505 via access paths $P_1$ and $P_2$, respectively.

Figure 6:
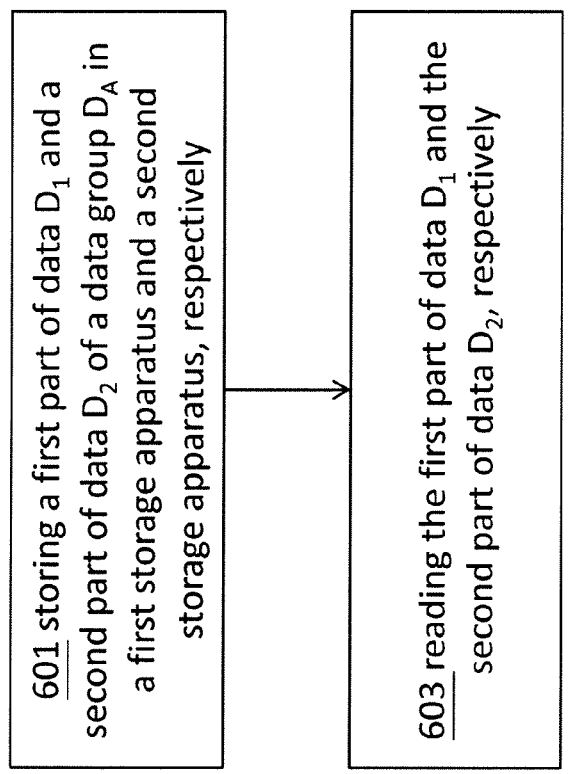
FIG. 6 shows a data access method in accordance with an embodiment of the present invention.

According to the embodiments discussed above, a data access method for the electronic apparatus shown in FIG. 2 could be concluded. The data access method in FIG. 6 is detailed as follows:

Step 601: storing a first part of data $D_1$ and a second part of data $D_2$ of a data group $D_A$ in a first storage apparatus and a second storage apparatus, respectively.

Step 603: reading the first part of data $D_1$ and the second part of data $D_2$, respectively.

The rest details could be found in the discussed embodiments, so they are omitted herein.

Based on the embodiments discussed above, a data group could be saved into two types of storage apparatuses having different characteristics to avoid the conventional problems caused by storing the whole data group in a single type of storage apparatus. That is, with two data access paths accessing two different types of storage apparatuses, the conventional problem that the transmission bandwidth to a single storage apparatus is exclusively occupied can be eliminated.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A data access method applicable on an electronic apparatus comprising a first storage apparatus and a second storage apparatus, the method comprising:
   storing a first part of data and a second part of data of an image frame in the first storage apparatus and the second storage apparatus, respectively, wherein the first storage apparatus comprises static random access memory and the second storage apparatus comprises a stand alone memory device with different characteristics compared to the static random access memory;
   selectively accessing the first storage apparatus and the second storage apparatus via different data access paths for the first part of data and the second part of data;

classifying portions of the image frame to the first part of data and the second part of data in an alternative fashion before the storing step; and the accessing step comprising accessing the first storage apparatus and the second storage apparatus in an alternative fashion, wherein access speed to the first storage apparatus is different from access speed to the second storage apparatus.

2. The data access method of claim 1, wherein the electronic apparatus further comprises at least one internal circuit, the first storage apparatus and the at least one internal circuit is integrated in a chip, the second storage apparatus is coupled to the electronic apparatus via an interface, and the second storage apparatus is removable from the interface.

3. The data access method of claim 1, wherein the image frame further comprises a third part of data, the second part of data is concatenated to the first part of data, and the third part of data is concatenated to the second part of data, the storing step comprising storing the first part of data and the third part of data in one of the first and the second storage apparatus and storing the second part of data in the other one of the first and the second storage apparatus; and the accessing step comprising sequentially accessing the first part of data, the second part of data, and the third part of data.

4. The data access method of claim 1, the storing step comprising storing a plurality of odd pixel rows of the image frame in one of the first and the second storage apparatus and storing a plurality of even pixel rows of the image frame in another one of the first and the second storage apparatus; and the accessing step comprising sequentially accessing the pixel rows of the image frame.

5. An electronic apparatus, comprising:

a first storage apparatus;

a second storage apparatus, wherein an access speed to the first storage apparatus is higher than an access speed to the second storage apparatus, wherein the first storage apparatus comprises static random access memory and the second storage apparatus comprises a stand alone memory device with different characteristics compared to the static random access memory; and a control unit, configured to access the first storage apparatus and the second storage apparatus via different data paths, wherein the control unit is further configured to store a first part of data and a second part of data of an image frame in the first storage apparatus and the second storage apparatus, respectively, and to selectively access the first storage apparatus and the second storage apparatus via different data paths for the first part of data and the second part of data, and wherein portions of the image frame are classified to the first part of data and the second part of data in alternative fashion, and the electronic apparatus accesses the first storage apparatus and the second storage apparatus in alternative fashion.

6. The electronic apparatus of claim 5, wherein the electronic apparatus further comprises at least one internal circuit, the first storage apparatus and the at least one internal circuit is integrated in a chip, the second storage apparatus is coupled to the electronic apparatus via an interface, and the second storage apparatus is removable from the interface.

7. The electronic apparatus of claim 5, wherein the image frame further comprises a third part of data, the second part of data is concatenated to the first part of data, and the third part of data is concatenated to the second part of data, wherein the control unit is further configured to store the first part of data and the third part of data in one of the first and the second storage apparatus, store the second part of data in another one of the first and the second storage apparatus, and sequentially access the first part of data, the second part of data, and the third part of data.

8. The electronic apparatus of claim 5, wherein the control unit is further configured to store a plurality of odd pixel rows of the image frame in one of the first and the second storage apparatus, store a plurality of even pixel rows of the image frame in another one of the first and the second storage apparatus, and sequentially access the pixel rows of the image frame.

* * * * *